May 3, 1966 M. E. EGGMAN 3,249,877

CHANNEL SELECTING DEVICE

Filed June 1, 1962 2 Sheets-Sheet 1

INVENTOR.
MAX E. EGGMAN
BY
Lockwood, Woodard, Smith & Weikart
Attorneys

May 3, 1966 M. E. EGGMAN 3,249,877

CHANNEL SELECTING DEVICE

Filed June 1, 1962 2 Sheets-Sheet 2

INVENTOR.
MAX E. EGGMAN

BY

Lockwood, Woodard, Smith & Weikart

Attorneys

United States Patent Office 3,249,877
Patented May 3, 1966

3,249,877
CHANNEL SELECTING DEVICE
Max E. Eggman, Fort Wayne, Ind., assignor to The Magnavox Company, Fort Wayne, Ind., a corporation of Delaware
Filed June 1, 1962, Ser. No. 199,347
3 Claims. (Cl. 325—456)

This invention relates generally to remote control television receivers and, more particularly, to a channel selecting device which is remotely operable and which can easily be set to provide a program of channels for automatic selection in sequence.

Heretofore, as a convenience and sales feature, some television sets have been provided with means whereby the television signal receiving and display unit can be located at one point and a manual control unit can be located at another point without any wire connections therebetween. Frequently, this is accomplished by a "supersonic" transmitter in the manual control unit, and a "supersonic" signal receiver in the television set which converts received supersonic control signals to mechanical operations for such functions as channel selection and volume control.

The channel selecting device heretofore used in television sets have usually incorporated an electric motor and drive means coupled between the motor and the channel tuner. Means are provided to control motor operation so that inactive channels are bypassed as the tuner shaft is rotated. Such means are usually referred to as programming means.

Most programming means heretofore available have been characterized by several disadvantages. One disadvantage is the fact that once programmed, it is inconvenient to change the program when the set is moved to another geographical area. Another disadvantage is the fact that separate pins or parts must be added or removed whenever the programming is to be changed. Additional disadvantages are noisy operation and the requirement of a multiplicity of switches to control the channel drive motor.

It is, therefore, a general object of the present invention to provide an improved channel selecting device.

It is a further object of the invention to provide a channel selecting device well suited to remote control, and easily programmed.

It is a further object of this invention to provide a channel selecting device having the foregoing characteristics and further characterized by simplicity of construction and reliability in operation.

It is a still further object to provide a device for achieving the foregoing objects with a minimum of noise.

Described briefly, a typical embodiment of the present invention incorporates an electric motor which is operable upon closure of any one of three switches, namely: a power tune switch, a remote control receiver relay switch, or a motor switch. The motor drives a Geneva movement and a cam to operate the motor switch and maintain motor operation after initiation thereof by either of the other two aforementioned switches. The Geneva movement includes a Geneva wheel connected to the channel tuner and having thirteen spring clips, each of which corresponds to a tuner channel, and each being readily positionable in either of two orientations with respect to the wheel. In one of the orientations of a clip, it is effective to hold the motor switch closed when the Geneva wheel has driven the tuner to the channel corresponding to the clip, whereby the wheel is driven to the next subsequent channel without termination of the motor operation. Thus, the device bypasses tuner channels which are ineffective to obtain stations in the geographical area where the set is located.

The motor has an off-set rotor and rotor shaft which are operable by solenoid action when the motor is energized to engage and drive the Geneva movement and also to close a television speaker muting switch.

The full nature of the invention will be understood from the accompanying drawings and the following description and the claims.

Figure 1:
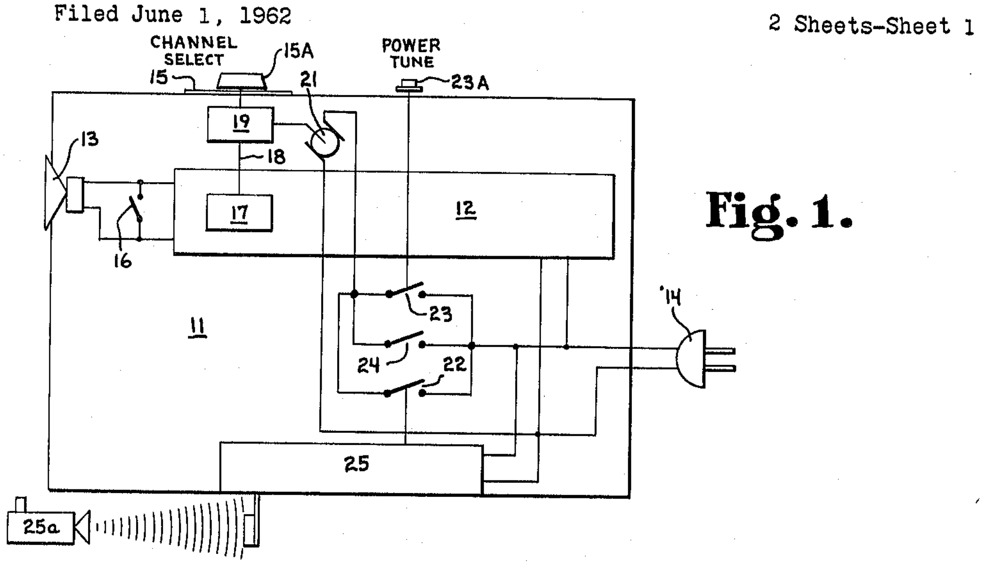
FIGURE 1 is a composite schematic and block diagram of a television set incorporating a typical embodiment of this invention.

Referring to FIG. 1, television set 11 may include any of the well-known television receiver electronics 12 having an audio output to the speaker 13. Power input is provided by the plug 14. A control panel plate 15 on the cabinet may be considered easily removable from the exterior of the set upon removal of the "channel select" knob 15A. The television receiver includes a muting switch 16 in shunt with the speaker for purposes which will become apparent. The receiver also includes a multiposition channel tuner 17 which may be any of the variety well known in the art for the tuning of television channels. For purposes of example, the tuner will be considered to have thirteen channel positions.

A tuner shaft 18 is driven through mechanism 19 which is a part of the present invention and will be described more fully hereinafter. Mechanism 19 is driven by the motor 21. Energization of the motor 21 can be effected by the closure of any of the three switches, namely: the remote control receiver relay switch 22, the power tune switch 23 and the motor switch 24.

The power tune switch may be understood to be closable by a suitable button 23A on the control panel of the television receiver. For purposes of example, the remote control receiver relay switch may be understood to be closable by a signal from any well known "supersonic" control signal receiver 25 located in the set. The switch closing signal is produced upon reception from the remote transmitter 25A of a supersonic signal of a specified frequency designated for the channel changing function. The motor switch 24 may be understood to be closable by a cam which will be described more fully hereinafter. Thus it is seen that either the power tune switch 23 or the remote receiver relay switch 22 is responsive to an externally applied manual impulse to initiate operation of motor 21.

Figure 2:
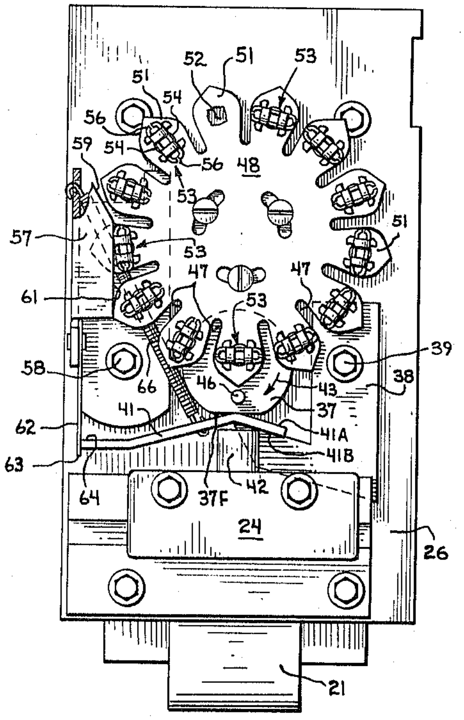
FIGURE 2 is a front elevation of a typical embodiment of this invention illustrating the motor switch cam in the neutral position and the Geneva wheel in a position where an active television channel is received.
Figure 3:
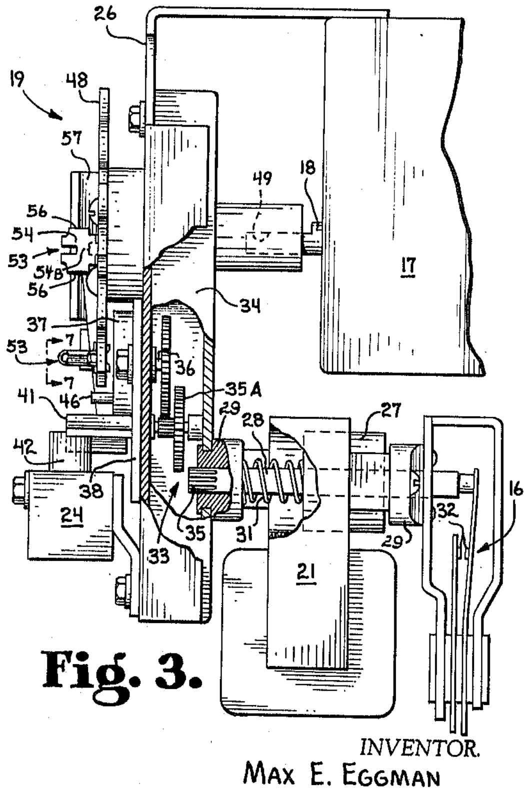
FIGURE 3 is a side elevation of the embodiment of FIGURE 2 in the same circumstances.

Referring to FIGS. 2 and 3 a frame 26 is provided and the motor 21 is mounted thereto. The motor may be of the shaded pole type having an off-set rotor 27 affixed to the rotor shaft 28 supported in suitable bearings 29. The rotor shaft and therefore the rotor 27 are held in the off-set position by a bias spring 31 until the motor is energized. In this manner the contacts 32 of the muting switch 16 are held open. Also the clutch 33 is disengaged.

It should be understood at this point that the clutch 33 is provided to transmit power from the motor 21 through the gear box 34 to a Geneva movement to be described hereinafter. In its simplest form, as illustrated, the clutch can merely consist of a drive pinion 35 engagable with a drive gear 35A upon axial movement of the pinion into mesh with the gear.

Therefore, when the motor is energized, which is usually accomplished either by closing the power tune switch or the remote control relay receiver switch, solenoid action brings the rotor into alignment with the stator of the motor whereupon the muting switch contacts 32 are closed to short the speaker 13. Also, the clutch 33 is engaged whereupon drive of the Geneva movement begins.

An output shaft 36 from the gear box has mounted thereto a motor switch cam 37. A motor switch activator bracket 38 is pivotally mounted at 39 to the frame 26 and has a cam follower plate 41, the upper surface 41A of which is engageable by the cam 37. The underside 41B of the plate 41 engages the operating button 42 of the motor switch 24. Operation of the motor 21 drives the cam 37 in the clockwise direction as indicated by the arrow 43. This rocks the bracket 38 counterclockwise with respect to the pivot 39 in a plane parallel to the plane of rotation of the cam whereupon the button 42 is depressed to close the motor switch 24.

A Geneva drive pin 46 is secured to the cam 37 and engages the notches or slots 47 in the outer marginal edge of the generally circular Geneva wheel 48. Wheel 48 is mounted in frame 26 for rotation in a plane parallel to the plane of rotation of the motor switch cam. It has a slot 49 in the rear end thereof to receive the tuner shaft 18. Suitable keying or index means are provided in the slot 49 and shaft 18 to assure proper index of the wheel and tuner as the wheel is driven by the driver pin 46. Sufficient slots 47 are provided in the circumference of the Geneva wheel to provide for thirteen distinct positions of the wheel as driven by the driver pin 46.

When the drive from one position to the next subsequent position is completed, the flat portion 37F of the motor switch cam has returned to engagement with the switch actuator bracket plate 41 whereupon the bracket returns to its normal position as shown in FIG. 2 and motor switch 24 is again opened. Therefore, as described to this point, the motor stops as soon as the Geneva wheel has been driven one channel position. However, recognizing that in most geographical areas, comparatively few of the number of channel positions provided on a tuner can obtain signals of acceptable strength, means are provided whereby operation of the motor is controlled to bypass these inactive positions without stopping until the next subsequent active channel is reached. These means will now be described.

In each of the fingers 51 of the Geneva wheel, there is provided an aperture 52 which receives a program clip 53. (In the drawings, clips are omitted from some of the figures to illustrate the shape and orientation of the apertures 52.) Each program clip has flat surfaces 54 and edges 56. Each clip can be oriented in its aperture 52 to either a "stop" attitude or a channel "pass" attitude. In the stop attitude, the flat surface 54 lies in a plane tangent to a circle about the axis of rotation of the Geneva wheel. In the pass attitude, it lies in a plane normal to a plane tangent to the circle. The specific case of the latter orientation which is usually used places a surface 54 on a radial line extending from the said axis of rotation. When the clip is turned to have its flat side on a radial line, it will cause the tuner motor to continue operating though a corresponding tuner channel position has been reached by the turner. This is achieved in a manner which will now be described.

Figure 4:
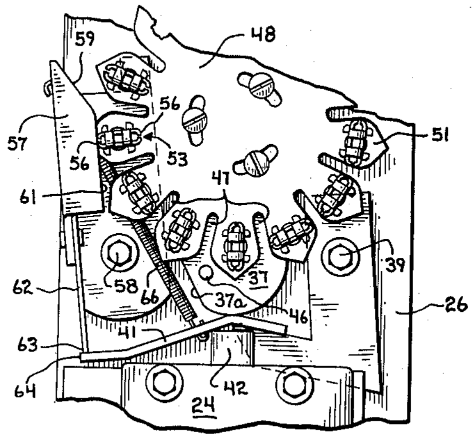
FIGURE 4 is a front elevation of the embodiment of FIGURE 2 but with the motor switch cam closing the motor switch and with the Geneva wheel in a position where there is an inactive television channel.

A program bracket 57 is pivotally mounted at 58 to the frame 26. It has a ramp 59 and edge 61 whereby the bracket is rocked counterclockwise on the pivot 58 upon engagement of the ramp 59 or edge 61 by a clip 53 oriented in the pass attitude as shown in FIG. 4 with its faces 54 radially oriented with respect to the Geneva wheel axis. At the lower edge of the program bracket, a spring member 62 is provided which is at an elevation above the upper face of the left-hand end of the actuator bracket plate 41 whenever the actuator bracket is moved to the switch closing position of FIG. 4. Therefore, movement of the program bracket to the hold position shown in FIG. 4 moves the lower end 63 of the spring 62 to a position immediately above the left-hand end 64 of the plate 41. Therefore, when the cam 37 returns to the neutral position, the lower end 63 of the spring 62 abuts the left-hand portion of plate 41 and holds the bracket 38 in the position shown in FIG. 4 and thereby keeps the motor switch 24 closed. The motor will, therefore, continue to drive the cam 37 and Geneva wheel 48 until the wheel has moved to a position where a program clip 53 is oriented in the stop position as shown in FIG. 2. Thereupon the program bracket can return to its inactive position as shown in FIG. 2 which will allow the motor switch to open when cam 37 returns to its neutral position, and the Geneva wheel is positioned to locate the tuner on an active television reception channel.

Figure 5:
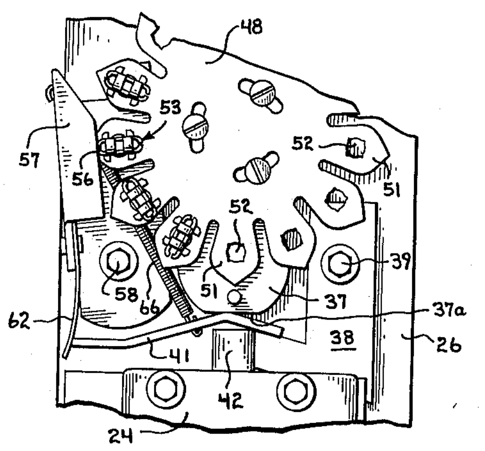
FIG. 5 is a front elevation like FIG. 4 but with the motor switch cam returned to the neutral position.

Direct manual tuning of the tuner shaft by knob 15A, of course, turns the Geneva wheel and causes the program clips corresponding to inactive channels to move the program bracket to the position shown in FIG. 4. However, the switch actuator bracket will be in the position shown in FIGS. 2 and 5. Interference between the program bracket and actuator bracket would ordinarily prevent the manual turning of the tuner to any position where a clip is oriented in the "pass" attitude and would therefore effectively prohibit manual turning. However, the abutting portion 62 is a spring leaf and is deformable as shown in FIG. 5 whereby no damage is done and direct manual tuning is facilitated even though the motor switch actuator bracket and the actuator cam therefor are in the neutral position. The resilient means biasing both the program bracket and the switch actuator bracket in a clockwise sense is provided by the spring 66 connected to the two brackets.

Figure 8:
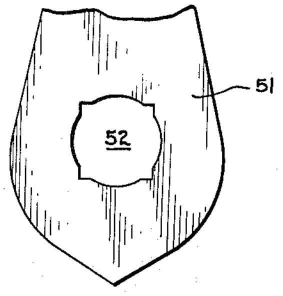
FIG. 8 is an enlarged fragmentary view of a Geneva wheel tooth with the program clip removed.

As shown particularly well in FIG. 8, apertures 52 are in the form of equilateral rectangles with the sides bowed or curved outwardly. By way of example, each aperture may be described as a cutout through the center of which can pass a .180 dia. circle and a square having .157-inch sides.

Figure 6:
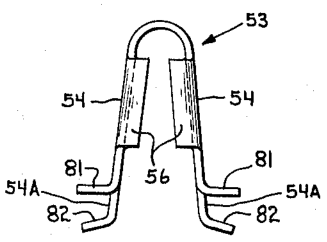
FIG. 6 is an enlarged end view of a program clip in the free condition.
Figure 7:
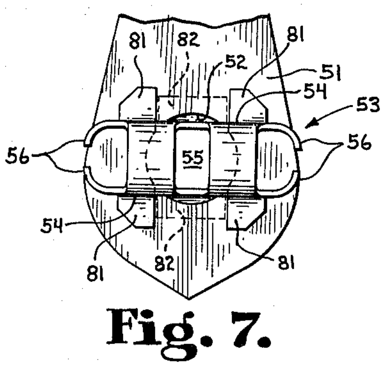
FIG. 7 is an enlarged view of the installed clip and viewed as indicated by line 7—7 in FIG. 3.

As shown in FIGS. 3, 6 and 7, the clips 53 are generally U-shaped and have flat sides 54 in generally parallel spaced relation. Each of the sides is curved at its ends to provide the curved ends 56 . Regardless of whether the Geneva wheel moves clockwise or counterclockwise, these curved ends are effective to easily and quietly move the program bracket to its hold position when the clip is oriented in the pass attitude. The ends 56 are of course at a substantially greater distance from center 55 than are sides 54.

Each side 54 has a leg 54A whose width 54B (FIG. 3) is substantially equal to the distance along a side between the corners of the aperture 52. For example, in an aperture of the size given above, the width may be .156 inch. Therefore, while the clips may be easily turned in the aperture by pressing the sides together, they are secure when released in either of their two alternative orientations. Retainers 81 and 82 adjacent the legs, engage the opposite faces of the Geneva wheel and prevent movement of the clips in a direction parallel to the wheel axis.

It will be recognized that the present invention, in addition to enabling the use of a minimal number of components to achieve the desired results, has operational advantages over devices known heretofore. For example, there is no reliance upon tuner detents to pull the tuner into position nor to disengage any of the components of the present invention. Furthermore, there is no reliance on inertia of the motor to effect desired functions such as for example, termination of drive of the Geneva wheel or disengagement of a drive pin. Extremely quiet operation can be provided and muting of the speaker is easily achieved. A single unit can be manufactured to be variously programmed from the front of the set by simply removing knob 15A and cover panel 15, without addition or removal of the pins or clips and without any special tools. Alternatively a unit can be manufactured with mechanism 19 of FIG. 1 located behind the tuner and the spring clips facing the back of the set for programming through a hole in the back.

One of the most important advantages of the present invention is that a single switch is used to control the motor whereas many devices employ a number of switches in connection with the drive mechanism to control the motor. Thus, it saves material cost, eliminates the labor of installing and adjusting other switches, and reduces the possibility of misadjustment, losing adjustment, contact breakdown and other switch problems.

In view of the foregoing, it can readily be recognized that all of the objects and advantages mentioned specifically above are achieved according to the present invention, as well as other objects not specifically mentioned. It will also be recognized that variations may be made within the scope of the present invention. Therefore, while the invention has been disclosed and described in some detail in the drawings and foregoing description, they are to be considered as illustrative and not restrictive in character as other modifications may readily suggest themselves to persons skilled in this art and within the broad scope of the invention, reference being had to the appended claims.

The invention claimed is:

1. A channel selecting device for a television receiver or the like comprising:

a Geneva movement for rotating a channel tuner shaft step by step, said movement including a slotted disc, a rotatable driver member having a pin operable in the slots of said disc to intermittently drive said disc during rotation of said driver member;

a motor coupled through a clutch to said driver member to rotate said driver member when said motor is energized;

a cam coupled through said clutch to said motor and driven thereby when said motor is energized;

a motor switch for energizing said motor, said motor switch being operable by said cam to keep said motor energized during a portion of the movement of said cam by said motor, and means for holding said motor switch in operated condition during presence of said disc in selected position thereof, said holding means including first and second levers, said first lever being coupled to said motor switch for operation of said switch, and said first lever being pivotable to switch operating position and said second lever being pivotable to hold position and have a portion abuttingly engageable with said first lever to hold said first lever in switch operating position, and said holding means including adjustable tabs on said disc at various locations of index on said disc, said tabs being adjustable to extened to engage said second lever during rotation of said disc to pivot said lever to hold position; and a spring connected to said first and second levers, said spring being located with respect to the pivots of said levers to bias said first lever away from said switch operating position and to bias said second lever away from abuttingly engaging relationship to said first lever.

2. A channel selecting device for a television receiver or the like comprising:

a Geneva movement for rotating a channel tuner shaft step by step, said movement including a slotted disc, a rotatable driver member having a pin operable in the slots of said disc to intermittently drive said disc during rotation of said driver member;

a motor coupled through a clutch to said driver member to rotate said driver member when said motor is energized;

a cam coupled through said clutch to said motor and driven thereby when said motor is energized;

a motor switch for energizing said motor, said motor switch being operable by said cam to keep said motor energized during a portion of the movement of said cam by said motor, and means for holding said motor switch in operated condition during presence of said disc in selected position thereof, said holding means including first and second levers, said first lever being coupled to said motor switch for operation of said switch, and said first lever being pivotable to switch operating position and said second lever being pivotable to hold position and have a portion abuttingly engageable with said first lever to hold said first lever in switch operating position, and said holding means including adjustable tabs on said disc at various locations of index on said disc, said tabs being adjustable to extend to engage said second lever during rotation of said disc to pivot said lever to hold position, the said abuttingly engageable portion of said second lever being deformable to accommodate pivotal action of said second lever to the hold position thereof when said first lever is away from said switch operating position thereof.

3. A channel selecting device for a television receiver or the like comprising:

a motor;

a member for coupling to a tuner, said member being coupled to said motor and mounted for rotation by said motor on an axis;

a plurality of lugs, said lugs being mounted to said member in a circle having its center on said axis of rotation of said member and each of said lugs being adjustable for orientation in a pass attitude and alternatively in a stop attitude with respect to said members;

a motor switch electrically coupled to said motor for energization of said motor;

a cam coupled to said motor and rotatable thereby;

a first pivotally mounted lever having a cam follower portion, a switch actuator portion, and an abutment portion, said lever being resiliently biased to normally engage the follower portion thereof with said cam, said lever being pivotable by rotation of said cam, and said lever being located to engage the switch actuator portion thereof with said switch to close said switch when said first lever is pivoted to a hold postion by rotation of said cam;

a second pivotally mounted lever having a first portion engageable by said lugs and having a spring leaf secured thereto and abuttingly engageable with said abutment portion of said first lever, said second lever being located and resiliently biased to normally provide clearance between said spring leaf and the abutment portion of said first lever, and said second lever being pivotable to a hold position by engagement of said first portion thereof by a lug oriented in said pass attitude, said spring leaf abutting said abutment portion of said first lever when said second lever is in said hold position thereof and said cam moves away from a position where it held said first lever in the hold position thereof, whereby said second lever holds said first lever in the hold position of said first lever, the resilient biasing of said first and second levers being provided by a single spring attached to said first and second levers.

References Cited by the Examiner

UNITED STATES PATENTS

| | | | |
|---|---|---|---|
| 2,285,684 | 6/1942 | Seeley | 334—21 X |
| 2,901,615 | 8/1959 | Davenderf et al. | 334—29 |
| 2,962,903 | 12/1960 | Kemeny | 318—467 X |
| 3,018,326 | 1/1962 | Petrick et al. | 318—467 X |
| 3,070,736 | 12/1962 | Polley | 318—467 |

ROBERT H. ROSE, *Primary Examiner.*

DAVID G. REDINBAUGH, *Examiner.*

R. F. ROTELLA, R. LINN, *Assistant Examiners.*